(12) United States Patent
Schaller et al.

(10) Patent No.: US 7,100,367 B2
(45) Date of Patent: Sep. 5, 2006

(54) DEVICE FOR EXHAUST GAS TREATMENT OF A COMBUSTION SYSTEM

(75) Inventors: Johannes Schaller, Leonberg (DE); Thomas Brinz, Bissingen Unter der Teck (DE); Ilona Ullmann, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/635,339

(22) Filed: Aug. 6, 2003

(65) Prior Publication Data
US 2004/0103652 A1    Jun. 3, 2004

(30) Foreign Application Priority Data
Aug. 14, 2002    (DE) .................. 102 37 165

(51) Int. Cl.
*F01N 3/00*    (2006.01)
(52) U.S. Cl. .................. 60/286; 60/274; 60/301; 60/303
(58) Field of Classification Search .................. 60/274, 60/286, 301, 303; 423/212, 235, 237, 352
See application file for complete search history.

(56) References Cited
U.S. PATENT DOCUMENTS

| 1,889,960 | A | * | 12/1932 | Hintzmann | .................... 252/2 |
| 2,647,873 | A | * | 8/1953 | Grimshaw et al. | .......... 508/585 |
| 3,756,794 | A | * | 9/1973 | Ford | ............................ 44/301 |
| 5,809,775 | A | * | 9/1998 | Tarabulski et al. | ............ 60/274 |
| 6,203,770 | B1 | | 3/2001 | Peter-Hoblyn et al. | |
| 6,361,754 | B1 | * | 3/2002 | Peter-Hoblyn et al. | .. 423/213.2 |
| 6,399,034 | B1 | * | 6/2002 | Weisweiler | .............. 423/213.2 |

FOREIGN PATENT DOCUMENTS

| JP | 2002-001066 | 1/2002 |
| JP | 2002-089241 | 3/2002 |
| WO | WO 99/01205 | 1/1999 |
| WO | WO 00/30733 | 6/2000 |
| WO | WO 00/75643 | 12/2000 |

* cited by examiner

*Primary Examiner*—Thomas Denion
*Assistant Examiner*—Diem Tran
(74) *Attorney, Agent, or Firm*—Kenyon & Kenyon LLP

(57) ABSTRACT

A device is provided for the exhaust gas treatment of a combustion system, e.g., a diesel combustion system. The device has a first storage unit for storing at least one urea-water solution, and an exhaust gas treatment is implemented without great expenditure. According to the present invention, this result is achieved by the urea-water solution including at least one additive for chemically influencing the urea-water solution.

15 Claims, 2 Drawing Sheets

DEVICE FOR EXHAUST GAS TREATMENT OF A COMBUSTION SYSTEM

FIELD OF THE INVENTION

The present invention relates to a device for the exhaust gas treatment of a combustion system, e.g., a diesel combustion system.

BACKGROUND INFORMATION

For exhaust gas aftertreatment, e.g., of diesel exhaust gases of diesel vehicles, the so-called "Selective Catalytic Reduction Method" (SCR method) for the removal of nitrogen oxides ($NO_x$) has been used. For this purpose, in appropriate reactors in the vehicle, the reducing agent ammonia ($NH_3$) is recovered, which selectively reacts with nitrogen oxides, among other things, to form molecular nitrogen.

In the most widespread SCR method in the vehicle field, a urea-water solution (UWS) is sprayed into the exhaust tract, the UWS decomposing by urea hydrolysis to $NH_3$ and carbon dioxide ($CO_2$). To support the hydrolysis, there is usually a so-called "hydrolysis catalyst" in the flow direction of the exhaust gas, after the the injection point.

A urea-water solution (UWS), for the purpose of understanding the present invention, is understood to be a liquid or solution containing at least urea and water. In the case of the conventionally used 32.5% solution, however, the low antifreezing property (eutectic at $-11°$ C.) may be disadvantageous, e.g., in vehicle applications.

In addition, it may be disadvantageous when using an UWS that it is decomposed by elevated temperatures beginning at $60°$ C. to $80°$ C. This generates ammonia ($NH_3$) and carbon dioxide ($CO_2$) from urea. The result may be that the solution, which is frequently originally a 32.5% solution, has a lower, generally unknown urea concentration because of this thermoses. However, without knowledge of the urea concentration, an optimal nitrogen oxide control of the exhaust gas cannot be ensured. This is so because if too much urea is added, poisonous ammonia is emitted, and if too little urea is added, a relatively large quantity of $NO_x$ is emitted.

At this time, discussions are already being held about a direct or indirect identification of the changing urea concentration of the UWS. The measuring methods appropriate for this, however, may only be able to be implemented at comparatively high cost and manufacturing complexity.

SUMMARY OF THE INVENTION

One object of the present invention is to provide a device for exhaust gas treatment of a combustion system, e.g., a diesel combustion system, having a first storage unit for storing a urea-water solution, whereby an optimized exhaust gas treatment is able to be implemented without great expenditure.

In accordance with the present invention, the urea-water solution includes at least one additive for chemically influencing the urea-water solution. The additive may be developed as an operating material for chemically stabilizing the urea-water solution. For example, at least one metering device may be provided for metering in the additive, i.e., the operating material. Using such an operating material, which is to be brought into the first storage unit using the metering device according to the present invention, decomposition of the UWS may be prevented to a large extent. According to the present invention, the conventionally known solution, e.g., standard 32.5% solution, may not decompose to any considerable extent, and this may ensure a more exact metering of the SCR-relevant urea quantity into the exhaust gas tract of the combustion system, e.g., of a vehicle such as a truck or a passenger car. In this manner, the so-called "ammonia slip" may be nearly completely prevented.

In one alternative variant of the present invention, the urea-water solution includes at least one antifreeze agent as an additive, to lower the freezing point of the urea-water solution.

By using such an antifreeze agent, the freezing of the urea-water solution may be prevented effectively in an elegant manner, even at low temperatures. This makes possible the operation of the device according to the present invention even at winter temperatures of the temperate or polar climatic zones. This is an advantage compared to the prior art, e.g., in the case of vehicle applications.

In an exemplary embodiment of the present invention, the additive or antifreeze agent may include at least varying proportion of ammonia ($NH_3$). Antifreeze agents conventionally used in the vehicle field, such as ethylene glycol, may impair the SCR process and lead to disadvantageous exhaust gas emissions, which is directly counter to the problem of exhaust gas treatment, and in addition to that, they may be comparatively uneconomical. In addition, the mass-related reducing agent content of the UWS may be lessened on account of the dilution with appropriate antifreeze agents.

In contrast to this, using an ammonia-containing antifreeze agent, or using nearly pure ammonia in a cost-effective manner, the freezing point of the UWS may be lowered and the mass-related reducing agent content of the UWS may be increased. In addition, ammonia has good solubility in water and in aqueous urea solution.

According to an exemplary embodiment of the present invention, an SCR method implemented with a device according to the present invention having a storage unit containing a reducing agent, in place of the conventional binary mixture of urea and water, an at least ternary mixture of ammonia, urea and water, as well as possibly additional additives such as emulsifiers, stabilizers, etc., is used.

If necessary, a ternary mixture of ammonia, urea and water may be prepared in the ready state and filled up in a vehicle, or put into the storage unit of the device according to the present invention, for example. Such a pre-prepared ternary mixture may be seasonally used and/or produced according to the present invention, i.e., during the winter phase.

Alternatively, or in combination with the above features, at least one appropriate metering device may be provided for metering in the additive or antifreeze agent to the urea-water solution. For example, at least one producing unit for producing the antifreeze agent may be provided, which is designed as a metering device. By having this, the antifreeze agent may be produced, for example, by converting an operating material that is possibly already present in the device according to the present invention and/or in the vehicle, so that, with regard to the antifreeze, separate filling up may be omitted. This lowers the cost of operating the device according to the present invention.

In an exemplary embodiment of the present invention, the producing unit has at least one heating device for heating the urea-water solution. Using this measure, ammonia is able to be produced by thermoses of the urea-water solution. The heating device may be operated, for example, electrically and in other ways, and/or it may be implemented as a heat exchanger so as to utilize the heat thrown off by a heat-producing component, e.g., of the vehicle. If necessary, the waste heat of the combustion system may possibly be used with the aid of a heat transfer fluid to operate the heating device.

The producing unit may include at least one catalytically active converting element for catalytically converting the urea-water solution. A producing unit developed as a catalyst in an advantageous manner may improve the production of ammonia. The converting element may be designed as a catalytically active configuration, which may have surface-enlarging protuberances. This additionally may improve the conversion of the urea-water solution, or the production of ammonia.

In another exemplary embodiment of the present invention, the storage unit may be developed as the producing unit. For instance, a pre-specified region of the storage unit may be heated using a heating device, and the contact surface of the storage unit with the UWS may be catalytically coated. Alternatively, a structurally separate producing unit may be situated inside the storage unit or integrated into it.

Furthermore, the producing unit may be positioned outside the storage unit and connected to it using appropriate lines.

In the case of a nearly constant, mass-related reducing agent content, the proportion of urea in the UWS may be reduced, and the proportion of ammonia may be correspondingly adjusted. This may be implemented in the variants of the present invention in which ammonia is produced using the filled up UWS or the UWS stored in the storage unit. In this case, according to the present invention, the freezing point is lowered and the conventionally used "hydrolysis catalyst," which is situated downstream (in the flow direction of the exhaust gas) from the injection point in the exhaust gas tract, is unloaded. This decomposes the urea of the UWS to ammonia and carbon dioxide, so that the frequently separate "SCR catalyst," which is situated downstream (in the flow direction)from the "hydrolysis catalyst" in the exhaust gas tract, selectively performs nitrogen oxide control in the exhaust gas in a conventional manner.

Furthermore, in the aforementioned exemplary embodiment, because of the lowered quantity of urea or the lowered urea proportion, the danger of clogging of the supply system which conveys the urea-water solution or the urea-water-ammonia solution to the exhaust gas tract, e.g., by the crystallizing out of urea, may be reduced.

In another exemplary embodiment of the present invention, at constant urea content of the UWS, the mass-related reducing agent content is increased by additionally input ammonia, and the freezing point of the solution is likewise reduced, according to the present invention.

Advantageously, the additive or the operating material may include varying proportions of carbon dioxide. With the aid of one of these measures, the chemical balance of the UWS decomposition is shifted to the side of urea on account of the $CO_2$ presence, so that the decomposition of the UWS to ammonia and carbon dioxide may be forestalled in a simple way.

Using the metering in of carbon dioxide, the creation of gaseous ammonia in the first storage unit may be avoided, so that the reducing agent concentration of the UWS is not diminished.

In another exemplary embodiment of the present invention, passing gaseous ammonia from the tank unit or the first storage unit into the SCR catalyst may be omitted, since, in contrast to the conventional methods, almost no gaseous, poisonous ammonia is created. In this manner, according to the present invention, the expenditure for exhaust gas treatment or nitrogen oxide control of corresponding exhaust gases is lowered.

In general, the addition of one of the reaction products, e.g., to the first storage unit, may be advantageous, since the chemical equilibrium of the reaction shifts to the side of the deduct(s), i.e. In this case, to the side of urea. Accordingly, the addition of ammonia using the metering device according to the present invention is also possible.

In another exemplary embodiment of the present invention, at least one second storage unit is provided for storing the additive or the operating material. This makes it possible that, e.g., as a function of the liquid level or the UWS quantity in the first storage unit, the operating material and the carbon dioxide may be metered in.

If necessary, the first storage unit and/or the second storage unit may have atmospheric pressure conditions. For example, at least one pressure generating unit may be provided for applying pressure to the additive and the operating material. Using this measure, for example, the operating material may be transported from the second storage unit into the first storage unit.

In addition, using the pressure-generating unit in the first storage unit, an overpressure, i.e. a pressure higher than the atmospheric pressure, may be generated, which may lead to a further shift of the chemical equilibrium to the deduct side. This has the effect of an additional stabilization of the urea concentration of the UWS.

The pressure generating unit may have at least one regulating unit for setting the pressure. With the aid of an appropriate regulating unit, for example, a nearly constant pressure may be set, above all in the first storage unit, independent of the liquid level of the UWS.

In another exemplary embodiment of the present invention, the second storage unit is designed as a pressure storage unit for storing the operating material under pressure. The second storage unit may be used at the same time as a pressure generating unit according to the present invention. This has the result that the second storage unit, developed as a pressure storage unit, transports the additive to the first storage unit using a pressure difference or a pressure drop.

Furthermore, using a second storage unit developed as a pressure storage unit, an increase in the density of the stored additive or operating material is achieved, so that the second storage unit is able to store a comparatively large additive quantity or operating material quantity at a relatively low volume. For example, the pressure storage unit may be developed as a $CO_2$ cartridge, a $CO_2$ gas cylinder, or the like.

The metering device may include at least one metering valve. In this manner, it is made possible for the additive or the operating material to be metered into the first storage unit in a comparatively simple manner. In general, the metering valve may be advantageously controlled or regulated using a regulating unit.

In another exemplary embodiment, at least one pressure sensor is provided for ascertaining the storage pressure of the first and/or the second storage unit. A pressure sensor may improve in an advantageous way the monitoring of the device, e.g., using the regulating unit. For example, using a pressure sensor, the filling up of the pressure storage unit or the second storage unit may be recorded. Furthermore, using a pressure sensor, the pressure of the first storage unit may be ascertained, and possibly a maximum and/or a minimum pressure may be set in the first storage unit with the aid of an aeration or deaeration device. An overpressure of approximately 100 millibars and or an underpressure of approximately 20 millibars may be specified, so that the first storage unit does not generally have to be designed as a pressure vessel or the like. This leads to an implementation of the first storage unit that may be economical and cost-effective, e.g., as a plastic tank or the like.

An intermediate storage unit may be provided, for the intermediate storage of gases of the first storage unit. In doing so, for the reduction of pressure, in the first storage unit, for example, $CO_2$-containing gas and possibly gas laced with traces of ammonia may be discharged. This gas mixture may be supplied to the second storage unit for reuse and/or supplied appropriately during the operation of the combustion unit.

DETAILED DESCRIPTION

In accordance with the present invention, an exemplary embodiment of a device for the treatment of an exhaust gas of a combustion unit, includes a tank 1, which stores a urea-water solution (UWS) 2. Through a discharge line 3 situated in the lower region of tank 1, UWS 2 is supplied to a supply system for supplying the stored operating fluid to the exhaust gas tract of, e.g., a vehicle having a diesel engine. The device for exhaust gas treatment according to an exemplary embodiment of the present invention may be built into a commercial motor vehicle or a passenger vehicle, or used in a stationary combined heat and power station or the like. For SCR reduction of the exhaust gases, the exhaust gas tract may, for example, include a hydrolysis catalyst or a conventional SCR catalyst.

Figure 1:
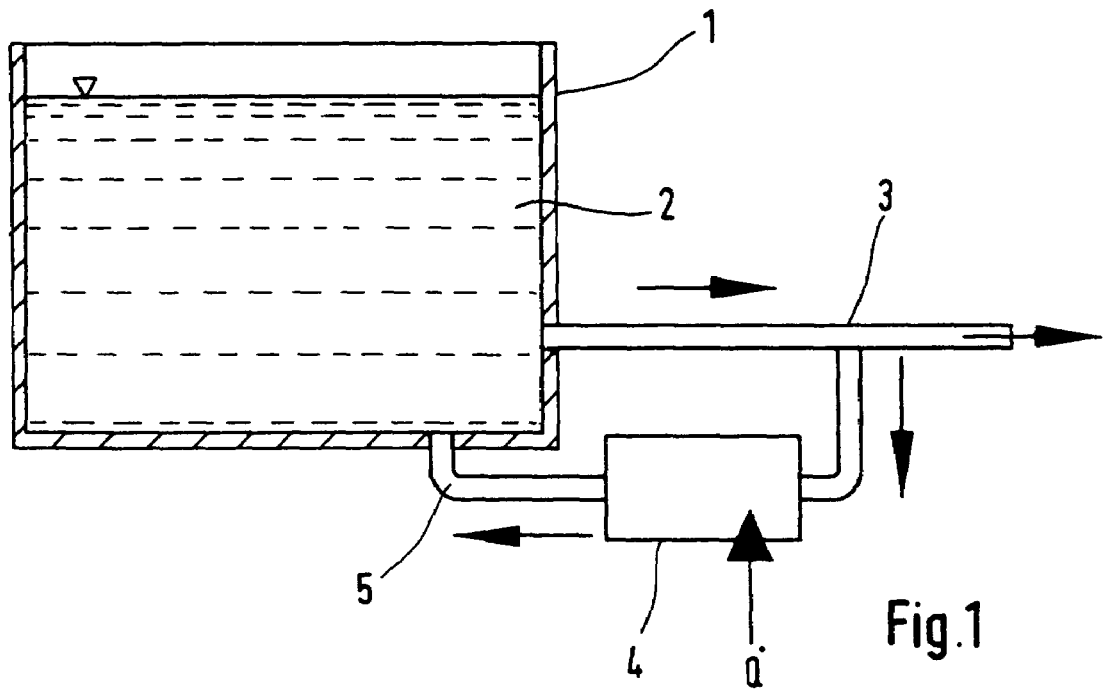
FIG. 1 shows a schematic representation of an exemplary embodiment of a device according to the present invention, which device has an externally positioned reactor.

According to FIG. 1, a reactor 4 is situated outside UWS tank 1. Reactor 4 is connected to line 3 in such a way that it receives a part of the liquid flow coming from tank 1, and with the aid of a heating device and catalytically active contents, for example, converts the urea of UWS 2 into ammonia. Because of this, there flows from reactor 4 through line 5 a UWS 2 significantly enriched with ammonia, or a ternary mixture of urea, water and ammonia, back into tank 1. In this manner, a circulation of UWS 2 is implemented. These measures lead to a gradual increase in the ammonia proportion of UWS 2, and to a reduction in the freezing point of the UWS 2 stored in tank 1 and the UWS 2 enriched with ammonia.

Figure 2:
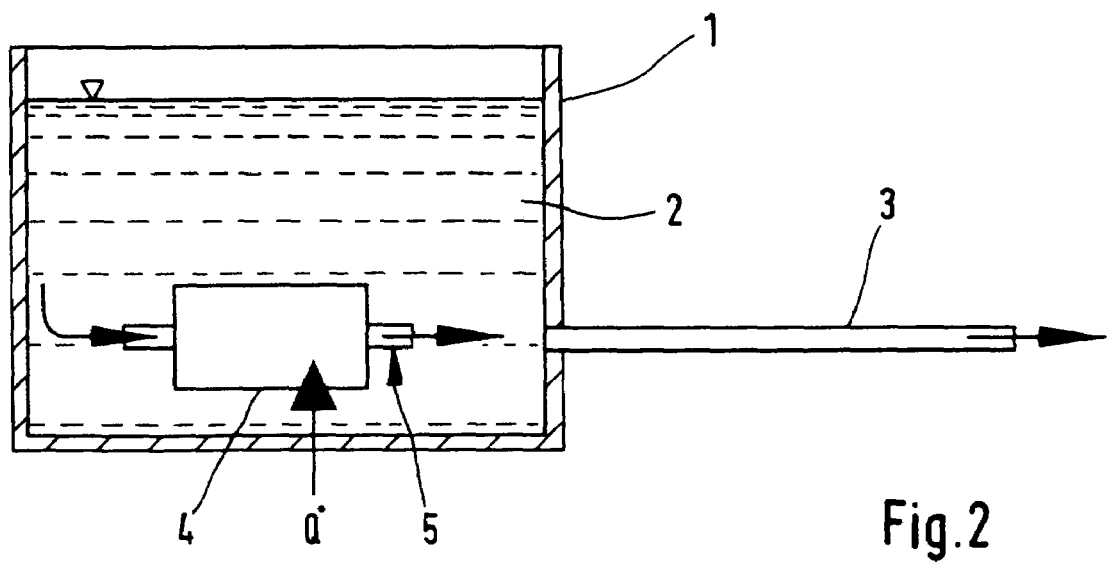
FIG. 2 shows a schematic representation of another exemplary embodiment of a device according to the present invention, which device has an integrated reactor.

According to FIG. 2, a reactor 4, which produces ammonia by using a heat supply Q and a catalytically active content, is integrated into tank 1. In this case, the UWS 2 flows all the way through reactor 4, and a mixture of ammonia ($NH_3$) and UWS 2 enriched with ammonia, or a ternary mixture of ammonia, urea and water, is produced and stored in tank 1. In this exemplary embodiment of the present invention, the freezing point of UWS 2 stored in tank 1 may be lowered because of the dissolved ammonia ($NH_3$).

Furthermore, other antifreeze agents, possibly in addition to the ammonia, may be added to UWS 2 stored in tank 1.

Figure 3:
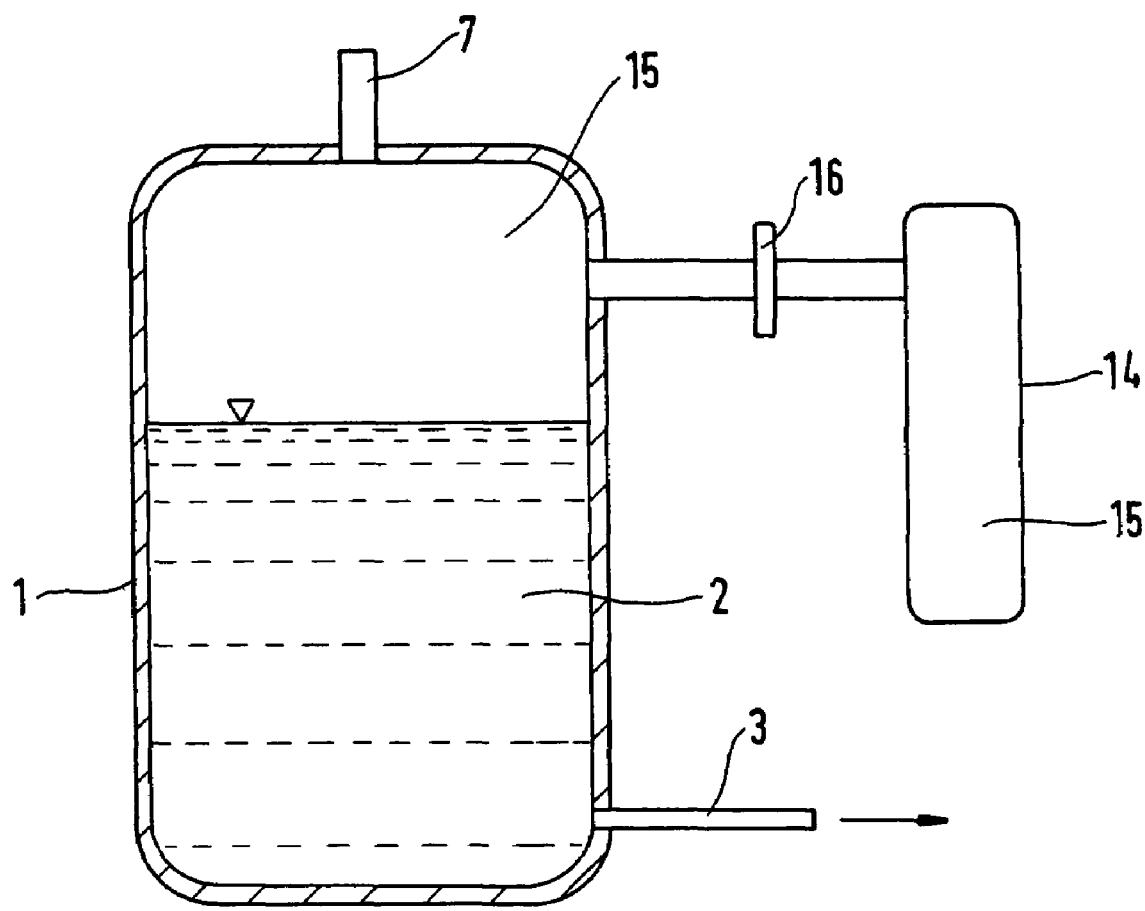
FIG. 3 shows a schematic representation of another exemplary embodiment of a device according to the present invention, which device has a second storage unit.

FIG. 3 shows a schematic representation of another exemplary embodiment of a device according to the present invention for the treatment of exhaust gas of a combustion system. The device according to the present invention includes a UWS tank 1 which stores a urea-water solution (UWS) 2. UWS 2 is supplied to a urea metering system not shown in greater detail, using a discharge line 3 situated in the lower region of tank 1. The urea metering system passes the UWS 2 to the exhaust gas flow of the combustion system, such as the Diesel engine. For the SCR reduction of the exhaust gases, the exhaust gas tract may include, for instance, a hydrolysis catalyst as well as an SCR catalyst, in a conventional manner.

To stabilize UWS 2 in tank 1 shown in FIG. 3, carbon dioxide ($CO_2$) 15 may be metered into tank 1 using a $CO_2$ pressure cartridge 14. In order to regulate the metered-in $CO_2$ quantity, a shutoff valve 16 is positioned between $CO_2$ cartridge 14 and tank 1 at the respective line.

In addition, as shown in FIG. 3, UWS tank 1 has a safety valve 7, which opens at an overpressure of approximately 100 millibars, and, if necessary, blows off excess $CO_2$ 15. Safety valve 16 ensures metering in of $CO_2$ 15 from cartridge 14, and the metering pressure should be selected to be less than a maximum pressure set by safety valve 7.

There may be provided a pressure sensor for monitoring the pressure in tank 1, as well as for monitoring or ascertaining the degree of filling of cartridge 14. The pressure sensor of tank 1 may be used, among other things, for regulating shutoff valve 16.

Additionally, components of the exemplary embodiments of the devices shown in FIGS. 1, 2 or 3 may be combined with one another in various manners, without departing from the principles of the present invention.

What is claimed is:

1. A device for treatment of an exhaust gas of a combustion system, comprising:
   a storage unit for storing at least one urea-water solution, wherein the urea-water solution includes at least one additive for chemically influencing the urea-water solution;
   wherein the additive includes an operating material for chemically stabilizing the urea-water solution;
   wherein the operating material includes carbon dioxide; and
   wherein the at least one additive is an antifreeze agent for lowering the freezing point of the urea-water solution and the antifreeze agent includes ammonia.

2. The device according to claim 1, wherein the combustion system is a diesel combustion engine.

3. The device according to claim 1, further comprising:
   a second storage unit for storing the additive.

4. The device according to claim 1, further comprising:
   at least one pressure-producing unit for applying pressure to the additive.

5. The device according to claim 1, further comprising:
   at least one metering device for metering the additive to the urea-water solution.

6. The device according to claim 5, wherein the storage unit includes a producing unit for producing the additive.

7. The device according to claim 5, wherein the metering device includes a producing unit for producing the additive.

8. The device according to claim 1, further comprising:
   at least one producing unit for producing the additive.

9. The device according to claim 8, wherein the producing unit includes at least one heating device for heating the urea-water solution.

10. The device according to claim 8, wherein the producing unit includes at least one catalytically active converting element for catalytically converting the urea-water solution.

11. The device according to claim 1, further comprising:
a second storage unit configured as a pressure storage unit for pressurized storage of the additive.

12. The device according to claim 11, further comprising:
at least one pressure sensor for ascertaining a storage pressure.

13. A method for treatment of an exhaust gas of a combustion system, comprising:
storing at least one urea-water solution in a storage unit; and
adding at least one additive to the urea-water solution for chemically influencing the urea-water solution;
wherein the additive includes an operating material for chemically stabilizing the urea-water solution;
wherein the operating material includes carbon dioxide; and
wherein the at least one additive is an antifreeze agent for lowering the freezing point of the urea-water solution and the antifreeze agent includes ammonia.

14. The method according to claim 13, wherein the combustion system is a diesel combustion system.

15. The method according to claim 13, further comprising:
metering the additive to be added to the urea-water solution using at least one metering device.

* * * * *